(12) United States Patent
Getzlaf et al.

(10) Patent No.: US 7,147,067 B2
(45) Date of Patent: Dec. 12, 2006

(54) ZEOLITE-CONTAINING DRILLING FLUIDS

(75) Inventors: Donald A. Getzlaf, Calgary (CA); Karen Luke, Duncan, OK (US); Russell M. Fitzgerald, Velma, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 60 days.

(21) Appl. No.: 10/795,158

(22) Filed: Mar. 5, 2004

(65) Prior Publication Data

US 2005/0000734 A1    Jan. 6, 2005

Related U.S. Application Data

(63) Continuation-in-part of application No. 10/738,199, filed on Dec. 17, 2003, which is a continuation-in-part of application No. 10/727,370, filed on Dec. 4, 2003, which is a continuation-in-part of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
*E21B 21/00* (2006.01)
*E21B 33/138* (2006.01)
*C09K 7/02* (2006.01)

(52) U.S. Cl. ............ 175/64; 166/292; 166/300; 175/65; 175/72; 507/110; 507/113; 507/114; 507/115; 507/118; 507/122; 507/125; 507/140; 507/906

(58) Field of Classification Search .......... None
See application file for complete search history.

(56) References Cited

U.S. PATENT DOCUMENTS

| | | | |
|---|---|---|---|
| 1,943,584 A | 1/1934 | Cross | 252/6 |
| 2,094,316 A | 9/1937 | Cross | |
| 2,131,338 A * | 9/1938 | Vail | 166/292 |
| 2,349,049 A | 5/1944 | Means | |
| 2,727,001 A | 12/1955 | Rowe | |
| 2,848,051 A | 8/1958 | Williams | |
| 3,047,493 A | 7/1962 | Rosenberg | |
| 3,065,170 A * | 11/1962 | Dumbauld et al. | 507/109 |
| 3,293,040 A * | 12/1966 | Shaler, Jr. et al. | 426/442 |
| 3,359,225 A | 12/1967 | Weisend | 260/29.6 |
| 3,694,152 A | 9/1972 | Sersale et al. | 423/329 |
| 3,781,225 A * | 12/1973 | Schwartz | 502/11 |
| 3,884,302 A | 5/1975 | Messenger | |
| 3,887,385 A | 6/1975 | Quist et al. | 106/96 |
| 3,888,998 A * | 6/1975 | Sampson et al. | 426/67 |
| 3,963,508 A | 6/1976 | Masaryk | |
| 4,141,843 A | 2/1979 | Watson | |
| 4,217,229 A | 8/1980 | Watson | |
| 4,311,607 A | 1/1982 | Kaeser | |
| 4,363,736 A * | 12/1982 | Block | 507/114 |
| 4,368,134 A | 1/1983 | Kaeser | |
| 4,372,876 A * | 2/1983 | Kulprathipanja et al. | 502/79 |
| 4,435,216 A | 3/1984 | Diehl et al. | |
| 4,444,668 A | 4/1984 | Walker et al. | |
| 4,468,334 A | 8/1984 | Cox et al. | |
| 4,474,667 A * | 10/1984 | Block | 507/114 |
| 4,482,379 A | 11/1984 | Dibrell et al. | |
| 4,515,216 A | 5/1985 | Childs et al. | 166/293 |
| 4,515,635 A | 5/1985 | Rao et al. | 106/90 |
| 4,530,402 A | 7/1985 | Smith et al. | 166/291 |
| 4,536,297 A | 8/1985 | Loftin et al. | |
| 4,548,734 A * | 10/1985 | Chaux et al. | 516/53 |
| 4,552,591 A | 11/1985 | Millar | |
| 4,555,269 A | 11/1985 | Rao et al. | 106/90 |
| 4,557,763 A | 12/1985 | George et al. | |
| 4,632,186 A | 12/1986 | Boncan et al. | |
| 4,650,593 A * | 3/1987 | Slingerland | 507/107 |
| 4,676,317 A | 6/1987 | Fry et al. | 166/293 |
| 5,759,964 A | 6/1987 | Shuchart et al. | 507/209 |
| 4,703,801 A | 11/1987 | Fry et al. | 166/293 |
| 4,717,488 A | 1/1988 | Seheult et al. | |
| 4,772,307 A | 9/1988 | Kiss et al. | |
| 4,784,693 A | 11/1988 | Kirkland et al. | |
| 4,818,288 A | 4/1989 | Aignesberger et al. | |
| 4,888,120 A | 12/1989 | Mueller et al. | |
| 4,986,989 A * | 1/1991 | Sirosita et al. | 424/635 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,131 A | 9/1992 | Burkhalter et al. | 106/822 |
| 5,238,064 A | 8/1993 | Dahl et al. | 166/293 |
| 5,252,554 A | 10/1993 | Mueller et al. | 507/138 |
| 5,301,752 A | 4/1994 | Cowan et al. | 166/292 |

(Continued)

FOREIGN PATENT DOCUMENTS

| | | |
|---|---|---|
| CA | 2153372 | 1/1996 |
| EP | 0 802 253 A1 | 10/1997 |
| EP | 0 895 971 A1 | 2/1999 |
| EP | 0 1260 491 A1 | 11/2002 |
| EP | 1 428 805 A1 | 6/2004 |

(Continued)

OTHER PUBLICATIONS

SPE 20624 entitled "Acidization of Analcime—Cementing Sandstone, Gulf of Mexico", by D. R. Underdown et al., dated 1990.

SPE 39595 entitled "Designing a Remedial Acid Treatment for Gulf of Mexico Deepwater Turbidite Sands Containing Zeolite Cement", by B. A. Rogers et al., dated 1998.

(Continued)

*Primary Examiner*—George Suchfield
(74) *Attorney, Agent, or Firm*—Craig W. Roddy; Haynes & Boone, LLP

(57) ABSTRACT

Methods and compositions for wellbore treating fluids, especially drilling fluids, that comprise zeolite and a carrier fluid.

43 Claims, No Drawings

U.S. PATENT DOCUMENTS

| | | | |
|---|---|---|---|
| 5,307,876 A | 5/1994 | Cowan et al. | 166/293 |
| 5,314,022 A | 5/1994 | Cowan et al. | 166/293 |
| 5,340,860 A | 8/1994 | Brake et al. | 524/166 |
| 5,346,012 A | 9/1994 | Heathman et al. | 166/293 |
| 5,383,967 A | 1/1995 | Chase | 106/737 |
| 5,435,846 A | 7/1995 | Tatematsu et al. | 106/813 |
| 5,464,060 A | 11/1995 | Hale et al. | 166/293 |
| 5,494,513 A | 2/1996 | Fu et al. | 106/672 |
| 5,501,276 A | 3/1996 | Weaver et al. | 166/291 |
| 5,529,624 A | 6/1996 | Riegler | 106/675 |
| 5,588,489 A * | 12/1996 | Chatterji et al. | 166/293 |
| 5,626,665 A | 5/1997 | Barger et al. | 106/706 |
| 5,680,900 A | 10/1997 | Nguyen et al. | 166/295 |
| 5,711,383 A * | 1/1998 | Terry et al. | 175/72 |
| 5,716,910 A | 2/1998 | Totten et al. | 507/102 |
| 5,788,762 A | 8/1998 | Barger et al. | 106/706 |
| 5,789,352 A | 8/1998 | Carpenter et al. | 507/209 |
| 5,807,810 A * | 9/1998 | Blezard et al. | 507/103 |
| 5,851,960 A | 12/1998 | Totten et al. | 507/118 |
| 5,866,517 A | 2/1999 | Carpenter et al. | 507/226 |
| 5,913,364 A | 6/1999 | Sweatman | 166/281 |
| 5,964,692 A * | 10/1999 | Blezard et al. | 516/59 |
| 5,990,052 A | 11/1999 | Harris | 507/214 |
| 6,060,434 A | 5/2000 | Sweatman et al. | 507/216 |
| 6,063,738 A | 5/2000 | Chatterji et al. | 507/269 |
| 6,070,664 A | 6/2000 | Dalrymple et al. | 166/281 |
| 6,138,759 A | 10/2000 | Chatterji et al. | 166/293 |
| 6,145,591 A | 11/2000 | Boncan et al. | 166/291 |
| 6,149,724 A | 11/2000 | Ulibarri et al. | |
| 6,167,967 B1 | 1/2001 | Sweatman | 166/281 |
| 6,170,575 B1 | 1/2001 | Reddy et al. | 166/293 |
| 6,171,386 B1 | 1/2001 | Sabins | 106/724 |
| 6,182,758 B1 | 2/2001 | Vijn | |
| 6,209,646 B1 | 4/2001 | Reddy et al. | |
| 6,213,213 B1 | 4/2001 | van Batenburg | 166/300 |
| 6,230,804 B1 | 5/2001 | Mueller et al. | 166/293 |
| 6,235,809 B1 | 5/2001 | Arias et al. | 523/130 |
| 6,245,142 B1 | 6/2001 | Reddy et al. | 106/724 |
| 6,258,757 B1 | 7/2001 | Sweatman et al. | 507/219 |
| 6,283,213 B1 | 9/2001 | Chan | 166/291 |
| 6,315,042 B1 | 11/2001 | Griffith et al. | 166/291 |
| 6,372,694 B1 * | 4/2002 | Osinga et al. | 507/140 |
| 6,379,456 B1 | 4/2002 | Heathman et al. | 106/724 |
| 6,390,197 B1 | 5/2002 | Maroy | |
| 6,405,801 B1 | 6/2002 | Vijn et al. | 166/293 |
| 6,409,819 B1 | 6/2002 | Ko | 106/707 |
| 6,457,524 B1 * | 10/2002 | Roddy | 166/293 |
| 6,475,275 B1 | 11/2002 | Nebesnak et al. | 106/803 |
| 6,478,869 B1 | 11/2002 | Reddy et al. | 106/724 |
| 6,488,091 B1 | 12/2002 | Weaver et al. | 166/300 |
| 6,494,951 B1 | 12/2002 | Reddy et al. | 106/705 |
| 6,508,305 B1 | 1/2003 | Brannon et al. | 166/293 |
| 6,508,306 B1 | 1/2003 | Reddy et al. | 166/295 |
| 6,524,384 B1 | 2/2003 | Griffith et al. | 106/705 |
| 6,555,505 B1 | 4/2003 | King et al. | 507/202 |
| 6,565,647 B1 | 5/2003 | Day et al. | 106/813 |
| 6,566,310 B1 | 5/2003 | Chan | 507/211 |
| 6,572,698 B1 | 6/2003 | Ko | 106/772 |
| 6,610,139 B1 | 8/2003 | Reddy et al. | 106/724 |
| 6,616,753 B1 | 9/2003 | Reddy et al. | 106/718 |
| 6,626,243 B1 | 9/2003 | Boncan | 166/293 |
| 6,645,289 B1 | 11/2003 | Sobolev et al. | 106/705 |
| 6,660,080 B1 | 12/2003 | Reddy et al. | 106/724 |
| 6,702,044 B1 * | 3/2004 | Reddy et al. | 175/64 |
| 6,719,055 B1 | 4/2004 | Mese et al. | 166/308 |
| 6,722,434 B1 * | 4/2004 | Reddy et al. | 166/292 |
| 6,767,868 B1 * | 7/2004 | Dawson et al. | 507/236 |
| 6,832,652 B1 | 12/2004 | Dillenbeck et al. | |
| 6,840,319 B1 | 1/2005 | Chatterji et al. | |
| 6,889,767 B1 | 5/2005 | Reddy et al. | |
| 2001/0014651 A1 | 8/2001 | Reddy et al. | 502/408 |
| 2002/0077390 A1 | 6/2002 | Gonnon et al. | 524/42 |
| 2002/0091177 A1 | 7/2002 | Gonnon et al. | 524/5 |
| 2002/0117090 A1 | 8/2002 | Ku | 106/737 |
| 2002/0157575 A1 | 10/2002 | DiLullo et al. | 106/711 |
| 2003/0153466 A1 * | 8/2003 | Allen et al. | 504/358 |
| 2003/0203996 A1 | 10/2003 | Gonnon et al. | 524/5 |
| 2004/0007162 A1 | 1/2004 | Morioka et al. | 106/714 |
| 2004/0040475 A1 | 3/2004 | Roij | 106/819 |
| 2004/0094331 A1 | 5/2004 | Mese et al. | 175/65 |
| 2004/0107877 A1 | 6/2004 | Getzlaf et al. | 106/813 |
| 2004/0108113 A1 | 6/2004 | Luke et al. | 166/292 |
| 2004/0112600 A1 | 6/2004 | Luke et al. | 166/295 |
| 2004/0188091 A1 | 9/2004 | Luke et al. | 166/291 |
| 2004/0188092 A1 | 9/2004 | Luke et al. | 166/291 |
| 2004/0244977 A1 | 12/2004 | Luke et al. | 166/292 |
| 2004/0262000 A1 * | 12/2004 | Morgan et al. | 166/293 |
| 2004/0262001 A1 * | 12/2004 | Caveny et al. | 166/293 |
| 2005/0000734 A1 | 1/2005 | Getzlaf et al. | 175/73 |
| 2005/0034864 A1 | 2/2005 | Caveny et al. | |
| 2005/0133222 A1 | 6/2005 | Arias et al. | |

FOREIGN PATENT DOCUMENTS

| | | |
|---|---|---|
| FR | 763.998 | 11/1933 |
| GB | 1469954 | 4/1977 |
| JP | 52117316 | 1/1977 |
| JP | 61021947 A | 1/1986 |
| JP | 07 003254 | 1/1995 |
| JP | 1011487 | 4/1998 |
| SU | 1373781 A | 2/1988 |
| WO | WO 98/54108 | 12/1998 |
| WO | 0170646 | 9/2001 |
| WO | WO 2005/059301 A1 | 6/2005 |

OTHER PUBLICATIONS

Paper entitled "Tectonis, fluid migration, and fluid pressure in a Deformed forearc basin, Cook Inlet, Alaska", by R. L. Bruhn et al., Pages 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., pp. 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali—Aggregate Expansion", by R. Sersale, pp. 404-410, dated 1987.

Paper entitled "Zeolite Crystallization In Portland Cement Concrete Due To Alkali-Aggregate Reaction", by S. A. Marfil et al., pp. 1283-1288, dated 1993.

Paper entitled "A study on the hydration rate of natural zeoite blended Cement pastes", by C. S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends With Portland Cement Clinker, Zeolite Tuff and Gypsum", by Ivan Janotka, et al., pp. 105-110, dated 1995.

Paper entitled "Study on the suppression effect on natural zeolite on Expansion of concrete due to alkali-aggregate reaction", by Feng Naiqian et al., pp. 17-24, dated 1998.

Paper entitled "Comparative study of the initial surface absorption and Chloride diffusion of high performance zeolite, silica fume and PFA Concrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Baroid Brochure entitled "Aquagel Gold Seal®" dated 2002. Halliburton brochure entitled "CFR-2 Cement Friction Reducer" dated 1999.

Halliburton brochure entitled "CFR-3 Cement Friction Reducer" dated 1998. Halliburton brochure entitled "D-Air 2 Anti-Foam Agent" dated 1999.

Halliburton brochure entitled Halad®-344 Fluid-Loss Additive dated 1998. Halliburton brochure entitled "Halad®-413 Fluid-Loss Additive" dated 1999.

Halliburton brochure entitled "HR®-5 Cement Additive" dated 1998. Halliburton brochure entitled "HR®-7 Cement Retarder" dated 1999.

Halliburton brochure entitled "MICROSAND Cement Additive" dated 1999. Halliburton brochure entitled SSA-1 Strength-Stabilizing Agent dated 1998.

Halliburton brochure entitled "SSA-2 Coarse Silica Flour" dated 1999.

Halliburton brochure entitled "Baroid BARAZAN® PLUS" dated 2002. Halliburton brochure entitled "Baroid EZ-MUD® Shale Stabilizer" dated 2002.

Halliburton brochure entitled "Baroid INVERMUL® Emulsifier" dated 2002. Halliburton brochure entitled "Baroid EZ MUL® Emulsifier" dated 2002.

Halliburton brochure entitled "Baroid EZ MUL® NTE Emulsifier" dated 2002. Halliburton brochure entitled "Baroid GELTONE® II Viscosifer" dated 2002.

Halliburton brochure entitled "Baroid GELTONE® V Viscosifier" dated 2002.

Halliburton brochure entitled "Baroid DURATONE® HT Filtration Control Agent" dated 2002.

Paper entitled "Zeolite P In Cements: Its Potential For Immobilizing Toxic And Radioactive Waste Species," by M. Atkins, et al., dated 1994.

Powder Diffraction File, PFD, Alphabetical Indexes for Experimental Patterns, Inorganic Phases, Sets 1-52, dated 2002.

Foreign communication from a related counterpart application dated Mar. 25, 2004.

Office action from a related counterpart application dated Dec. 4, 2003.

Portland Cement Association, "Portland Cement, Concrete, and Heat of hydration", Concrete Technology Today, (1997), pp. 1-4, vol. 18, No. 2, Construction Information Services Department of the Portland Cement Association.

International Center for Materials Technology Promotion, "Special Cements and Their Production Technology: CSA Series, Hydraulic Cement Series, Oil Well Cement Series etc: Hydraulic Engineering Cement", (2003).

Foreign communication from a related counterpart application dated Nov. 25, 2004.

U.S. communication from a related counterpart application dated Jun. 25, 2004.

U.S. communication from a related counterpart application dated Sep. 10, 2004.

U.S. communication from a related counterpart application dated Nov. 9, 2004.

Foreign communication from a related counterpart application dated Aug. 23, 2004.

Foreign communication from a related counterpart application dated Jul. 28, 2005.

Office action from a related counterpart application dated Sep. 7, 2005.

Office action from a related counterpart application dated Nov. 4, 2005, U.S. Appl. No. 10/727,730.

Office action from a related counterpart application dated Nov. 7, 2005, U.S. Appl. No. 10/738,199.

Office Action from a related counterpart application, U.S. Appl. No. 10/623,443 dated Mar. 3, 2006.

Office Action from a related counterpart application, U.S. Appl. No. 11/126,626 dated Jun. 23, 2006.

Luke, K. et al., "Zeolite-Containing Remedial Compositions" filed Jul. 17, 2006 as U.S. Appl. No. 11/488,388.

Office action from application U.S. Appl. No. 10/623,443 dated Jul. 27, 2006.

Office action from application U.S. Appl. No. 11/338,485 dated Aug. 11, 2006.

Office Action dated Dec. 27, 2005, from a related counterpart application 10/816,034 filed Apr. 01, 2004.

Foreign Communication from a related counterpart application dated Nov. 4, 2005.

Office Action from a related counterpart application (11/126,626) dated Dec. 7, 2005.

* cited by examiner

ZEOLITE-CONTAINING DRILLING FLUIDS

CROSS-REFERENCE TO RELATED APPLICATIONS

This application is a continuation-in-part of prior application Ser. No. 10/738,199 filed Dec. 17, 2003, the entire disclosure of which is incorporated herein by reference, which is a continuation-in-part of prior application Ser. No. 10/727,370 filed Dec. 4, 2003, the entire disclosure of which is incorporated herein by reference, which is a continuation-in-part of prior application Ser. No. 10/686,098 filed Oct. 15, 2003, (now U.S. Patent No. 6,964,302, issued Nov. 15, 2005), the entire disclosure of which is incorporated herein by reference, which is a continuation-in-part of prior application Ser. No. 10/623,443 filed Jul. 18, 2003, the entire disclosure of which is incorporated herein by reference, and which is a continuation-in-part of prior application Ser. No. 10/315,415, filed Dec. 10, 2002, (now U.S. Patent No. 6,989,057, issued Jan. 24, 2006), the entire disclosure of which is incorporated herein by reference.

BACKGROUND

The present embodiment relates generally to a treating fluid, particularly a drilling fluid, for introduction into a subterranean zone penetrated by a wellbore.

Conventionally, a wellbore is drilled into a subterranean zone using a drilling fluid that is circulated through the wellbore. During the drilling of a wellbore, the drilling fluid is continuously circulated down the drill pipe, through the drill bit, and back to the surface through the annulus between the drill pipe and the walls of the wellbore. After a wellbore has been drilled to total depth, the circulation of the drilling fluid is stopped (called a "shut-down period"), while the well is logged and pipe is run in the wellbore.

One function of a drilling fluid is to seal off the walls of the wellbore so that the fluid is not lost into highly permeable subterranean zones penetrated by the wellbore. During the shut down period, this is accomplished by the deposit of a filter cake of solids from the drilling fluid, and additional dehydrated drilling fluid and gelled drilling fluid, on the walls of the wellbore.

After the pipe is run in the wellbore, the drilling fluid in the wellbore is cleaned up by re-initiating circulation of drilling fluid. The drilling fluid is circulated downwardly through the interior of the pipe and upwardly through the annulus between the exterior of the pipe and the walls of the wellbore, while removing drilling solids, gas, filter cake, dehydrated drilling fluid, gelled drilling fluid, cuttings, and any other debris needing to be removed from the wellbore. Thus, a drilling fluid must be capable of transporting a sufficient amount of cuttings and other debris through the annulus and up to the surface in order to provide a clean wellbore for subsequent cementing operations.

After the wellbore is cleaned by the drilling fluid, primary cementing operations are performed therein. Namely, the pipe is cemented in the wellbore by placing a cement slurry in the annulus between the pipe and the walls of the wellbore. The cement slurry sets into a hard impermeable mass, and is intended to bond the pipe to the walls of the wellbore whereby the annulus is sealed and fluid communication between subterranean zones or to the surface by way of the annulus is prevented.

As a result of the polymeric viscosifiers and additives typically used in drilling fluids, the filter cake formed is generally very stable and can be difficult to remove. However, removal of the gelled and dehydrated drilling fluid and filter cake from the walls of the wellbore and displacement of the drilling fluid from the wellbore must take place prior to primary cementing operations in order to achieve a satisfactory bond between the pipe, primary cement and the walls of the wellbore.

Heretofore, attempts have been made to remove the drilling fluid and filter cake from the wellbore by attaching mechanical scrapers to the pipe so that as the pipe is run into the well bore, it physically contacts and breaks up some of the drilling fluid and filter cake. In addition, flushes are normally run through the annulus between the pipe and the walls of the wellbore prior to cementing in order to remove drilling fluid and filter cake therein. It is also known to use spacer fluids in oil and gas wells to displace drilling fluids and remove filter cake deposits from the walls of the wellbore. Other methods for removing drilling fluid and filter cake from the wellbore include pumping fluids through the annulus at high rates so that they are in turbulence as they contact the filter cake, and including surfactants in flush fluids to lower surface tension and enhance the penetration of the flush fluids into the filter cake. If appreciable drilling fluid and filter cake remain on the walls of the wellbore, primary cementing operations are less than satisfactory, as the cement will not properly bond to the walls of the wellbore and fluid leakage through the annulus and other major problems can result.

Still other methods for achieving satisfactory primary cementing operations when deposits of filter cake are an issue include laying down a settable filter cake on the walls of the wellbore and activating the filter cake to harden and set up. Thus, any remaining filter cake is less likely to interfere with primary cementing operations.

DESCRIPTION

According to certain embodiments described herein, methods are provided for circulating a drilling fluid comprising zeolite and a carrier fluid through a wellbore.

According to still other embodiments described herein, methods are provided for using zeolite as a suspending agent in a drilling fluid, whereby the drilling fluid has sufficient carrying capacity and thixotropy to transport cuttings through the annulus and out to the surface. According to such embodiments, the zeolite acts as a suspending agent for one or more of cuttings, a weighting agent, and loss circulation material. Examples of loss circulation materials include clay and aqueous rubber latex or hydratable polymers (e.g., U.S. Pat. Nos. 5,913,364; 6,060,434; 6,167,967; 6,258,757, the entire disclosures of which are incorporated herein by reference), which form masses that seal the space fractures, vugs, thief zones and the like in a wellbore.

According to still other embodiments described herein, portions of a zeolite-containing drilling fluid are left on the walls of a wellbore as part of a filter cake, and/or in permeable areas affecting the wellbore, such as fissures, fractures, caverns, vugs, thief zones, low pressure subterranean zones or high pressure subterranean zones. According to such an embodiment, the zeolite in the portions of the drilling fluid left in the wellbore acts as a settable material, which can be caused to set by an activator. According to one embodiment, a subsequent composition that contains at least one activator is pumped into the wellbore to come into contact with the drilling fluid left therein. In one such embodiment, the subsequent composition containing at least one activator is a treating fluid, such as a mud, pill, or spotting fluid, and is pumped into the wellbore prior to primary cementing operations. According to another embodiment, the subsequent composition containing at least one activator is a cement slurry pumped into the wellbore during cementing operations.

When the activator in the subsequent composition contacts the drilling fluid in the filter cake and/or permeable areas, the activator causes the zeolite in the drilling fluid to set. In addition, when the subsequent composition is a cement slurry, as the cement slurry sets, the activator therein diffuses into the drilling fluid left in the filter cake and/or permeable areas in the wellbore.

The activator is present in the subsequent composition in a compressive strength-developing amount, and may be one or more of calcium hydroxide, calcium oxide, calcium nitrate, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof. Selection of the type and amount of an activator(s) largely depends on the type and make-up of the composition in which the activator is contained, and it is within the means of those of ordinary skill in the art to select a suitable type and amount of activator.

Thus, according to the present embodiments, zeolite left in a wellbore by a zeolite-containing drilling fluid can be caused to set by an activator in a composition placed in the wellbore subsequent to the drilling fluid. Zeolite that sets in permeable areas affecting the wellbore, such as fissures, fractures, caverns, vugs, thief zones, low pressure subterranean zones or high pressure subterranean zones effectively seals such permeable areas, thereby preventing the entry or flow of formation fluids into the annulus. In addition, because drilling fluid does not set, its removal is a concern for subsequent cementing operations. Causing the zeolite left in the wellbore by the drilling fluid to set creates conditions more favorable for primary cementing operations, as well as reduces the need for other fluids or methods conventionally used to remove drilling fluid and/or filtercake from a wellbore.

Other embodiments described herein provide a drilling fluid comprising zeolite and a carrier fluid. Drilling fluids according to the such embodiments provide sufficient carrying capacity and thixotropy to transport cuttings to the surface and prevent the cuttings from settling appreciably when circulation is interrupted.

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

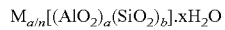

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Zeolites suitable for use in a drilling fluid according to the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), and stilbite (hydrated sodium calcium aluminum silicate). According to certain embodiments, the zeolite is one of chabazite and clinoptilolite.

According to one embodiment, the drilling fluid includes zeolite in an amount of from about 1% to about 50% by volume. According to another embodiment, the drilling fluid includes zeolite in an amount of from about 5% to about 20% by volume. According to yet another embodiment, the drilling fluid includes zeolite in an amount of from about 8% to about 15% by volume.

According to still other embodiments described herein, a drilling fluid comprises zeolite and a carrier fluid, and further comprises one or more of a weighting agent, a filtrate control agent, a dispersant, loss circulation material, a surfactant (such as an emulsifier or a foaming agent), a de-air entraining agent and a lubricant. In addition, a drilling fluid according to the present embodiments can comprise zeolite and a carrier fluid, and can further comprise a viscosifier.

As used herein the term "viscosifier" means any agent that increases the viscosity of a fluid. In a drilling fluid, viscosifiers add viscosity to the drilling fluid to impart sufficient carrying capacity and thixotropy, whereby the drilling fluid can transport cuttings out of the wellbore to the surface, and prevent cuttings from settling appreciably when circulation of the drilling fluid is interrupted. In the present embodiments, the zeolite provides the drilling fluid with suspension properties, and therefore is a suitable replacement for conventional viscosifiers. However, the zeolite can also be used in conjunction with conventional viscosifiers known to those of ordinary skill in the art.

Agents which are useful as conventional viscosifiers include, but are not limited to, clays; polymeric additives, whether natural or synthetic; modified cellulose and derivatives thereof; guar gum; diatomaceous earth; and starches. The choice of a viscosifier depends upon the viscosity desired, chemical capability with other fluids used in formation of the wellbore, and other wellbore design concerns.

Clays suitable for use as viscosifiers include kaolinites, montmorillonite, bentonite, hydrous micas, attapulgite, sepiolite, and the like and also synthetic clays, such as laponite.

Polymeric additives suitable for use as a viscosifier in the present embodiments include polymers which contain, in sufficient concentration and reactive position, one or more hydroxyl, cis-hydroxyl, carboxyl, sulfate, sulfonate, amino or amide functional groups. Particularly suitable polymers include polysaccharides and derivatives thereof which contain one or more of the following monosaccharide units: galactose, mannose, glucoside, glucose, xylose, arabinose, fructose, glucuronic acid or pyranosyl sulfate. Natural polymers containing the foregoing functional groups and units include guar gum and derivatives thereof, locust bean gum, tara, konjak, starch, cellulose, karaya gum, xanthan gum, tragacanth gum, arabic gum, ghatti gum, tamarind gum, carrageenan and derivatives thereof. Synthetic polymers and copolymers that are suitable for use as a viscosifier in the present embodiments include, but are not limited to, polyacrylate, polymethacrylate, polyacrylamide, maleic anhydride, methylvinyl ether copolymers, polyvinyl alcohol and polyvinylpyrrolidone.

Modified gums such as carboxyalkyl derivatives, like carboxymethyl guar, and hydroxyalkyl derivatives, like hydroxypropyl guar are also suitable viscosifiers. Doubly derivatized gums such as carboxymethylhydroxypropyl guar (CMHPG) are also suitable viscosifiers.

Modified celluloses and derivatives thereof, for example, cellulose ethers, esters and the like can also be used as a viscosifier of the wellbore treating fluids of the present embodiment. In general, any of the water-soluble cellulose ethers can be used. Those cellulose ethers include, among others, the various carboxyalkylcellulose ethers, such as carboxyethylcellulose and carboxymethylcellulose (CMC); mixed ethers such as carboxyalkylethers, e.g., carboxymethylhydroxyethylcellulose (CMHEC); hydroxyalkylcelluloses such as hydroxyethylcellulose (HEC) and hydroxypropylcellulose; alkylhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; and the like.

Preferred polymeric additives for use as a viscosifer with the embodiments disclosed herein include those selected from the group consisting of welan gum, xanthan gum, galactomannan gums, succinoglycan gums, scleroglucan gums, and cellulose and its derivatives, particularly hydroxyethylcellulose.

In one embodiment where the drilling fluid comprises zeolite, a carrier fluid, and a viscosifier, the drilling fluid includes the viscosifier in an amount of up to about 5% by volume. In another embodiment, the drilling fluid includes the viscosifier in an amount of from about 0.5% to about 2.5% by volume.

In still another embodiment, a drilling fluid includes zeolite, a carrier fluid and a filtrate loss control additive in an amount of from about 0.01% to about 2.5% by volume. According to another embodiment, the drilling fluid includes a filtrate loss control additive in an amount of from about 0.1% to about 1.0% by volume.

In yet another embodiment, the drilling fluid comprises zeolite, a carrier fluid and a dispersant. Suitable dispersants include those selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers. According to one such embodiment, the drilling fluid includes from about 0.02% to about 6.0% by volume of a dispersant, and according to another such embodiment from about 0.1% to about 2.0% by volume of a dispersant.

According to still other embodiments, a drilling fluid comprises zeolite and a carrier fluid, and further comprises a weighting agent. Preferred weighting agents include those selected from the group consisting of barium sulfate, also known as "barite", hematite, manganese tetraoxide, galena, ilmenite and calcium carbonate. According to one such embodiment, a weighting agent is present in a drilling fluid in an amount up to about 97% by volume, and according to another such embodiment, in an amount of from about 2% to about 57% by volume.

Carrier fluids suitable for use in the embodiments of drilling fluids disclosed herein comprise an aqueous fluid, such as water and water-based gels, oil-based and synthetic-based fluids, emulsions, acids, or mixtures thereof. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins and ethers.

According to certain embodiments, a carrier fluid or mixture thereof is present in the drilling fluid in an amount of from about 3% to about 98% by volume. According to other embodiments, a carrier fluid or mixture thereof is present in an amount of from about 50% to about 92% by volume. According to still other embodiments, a carrier fluid or mixture thereof is present in an amount of from about 80% to about 90% by volume. The preferred carrier fluid depends upon the properties desired for the drilling fluid and the cost, availability, temperature stability, viscosity, clarity, and the like of the carrier fluid. Based on cost and availability, water is preferred. When the carrier fluid is water, the water can be fresh water, unsaturated salt solution, including brines and seawater, or saturated salt solution.

According to still other embodiments, a method of performing drilling operations is provided, where the method includes circulating a drilling fluid comprising zeolite and a carrier fluid in a wellbore penetrating a subterranean zone. According to certain examples of such methods, the zeolite is present in the drilling in an amount from about 1% to about 50% by volume, or from about 5% to about 20% by volume, or from about 8% to about 15% by volume.

According to still other embodiments, a method of performing drilling operations is provided, where the method includes circulating a drilling fluid comprising zeolite and a carrier fluid in a wellbore penetrating a subterranean zone, and suspending, in the drilling fluid, one or more of cuttings, a weighting agent, and loss circulation material. According to such methods, the zeolite acts as a suspending agent for the cuttings, weighting agent, or loss circulation material.

Still other embodiments provide a method of performing drilling operations that includes penetrating a subterranean zone with a wellbore, circulating a drilling fluid comprising zeolite and a carrier fluid in the wellbore, leaving a portion of the drilling fluid in the wellbore, and causing the zeolite in the remaining portion of the drilling fluid to set. In certain examples of such methods, the zeolite is caused to set by placing a subsequent composition that has a compressive strength-developing amount of an activator in the wellbore, (such as calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate), and contacting the zeolite in the remaining portion of the drilling fluid with the activator. The subsequent composition in such examples can be a cement slurry, a mud, a spotting fluid, or a pill that includes the activator.

The following examples are illustrative of the methods and compositions discussed above.

EXAMPLE 1

Five water-based drilling fluids ("Fluids 1–5 ") were prepared by combining the components as set forth in TABLE 1A below. The components listed in Table 1A were added one at a time to the carrier fluid (water) in a Waring blender at an rpm where the vortex was evident, usually between 2000–4000 rpm, in intervals of 15 seconds. After all the components had been added to the carrier fluid, the fluid was then blended for 2 minutes at 2000–4000 rpm.

Bentonite, barite (also known as barium sulfate), caustic soda and lime, as well as sources of same, are widely commercially available chemicals that are well known to those of ordinary skill in the art. Bentonite, was the primary viscosifer contributing suspension properties to the fluids in which it was used (Fluids 1 and 4).

CFR-3 is the tradename for a dispersant comprising the condensation product of formaldehyde, acetone and a sulfite, and is commercially available from Halliburton Energy Services.

Biozan was used in this example to provide filtrate control, but is generally known as a viscosifier comprising a clarified xanthan gum. Biozan is commercially available from GEO Drilling Fluids, Inc. As a viscosifier, Biozan contributed some suspension properties to the fluids in which it was used. However, the relative amounts of Biozan to the primary viscosifier (bentonite in Fluids 1 and 4, zeolite in Fluids 2, 3 and 5) is such that the viscosifying effect of the Biozan is secondary to the viscosifying effect of the primary viscosifier.

CARBONOX is the tradename for a lignite material that is commercially available from Baroid Drilling Fluids, and is used in this example as a filtrate control additive.

FWCA was used in this example to provide filtrate control, and is generally known as a free water control additive comprising cellulose that is commercially available from Halliburton Energy Services. As a cellulose, FWCA contributed some suspension properties to the fluids in which it was used. However, the relative amounts of FWCA to the primary viscosifier (zeolite in Fluids 2, 3 and 5) is such that the viscosifying effect of the FWCA is secondary to the viscosifying effect of the primary viscosifier.

Chabazite, which is commercially available from C2C Zeolite Corporation of Calgary, Canada was the zeolite in Fluids 2, 3 and 5, and was used as the primary viscosifer to contribute suspension properties to the fluids.

The components were added as described herein on the basis of percent by volume of the total drilling fluid composition. Fluids 1 and 4 are exemplary of conventional water-based drilling fluids, while Fluids 2, 3, 5 are exemplary of water-based drilling fluids containing zeolite according to the present embodiments. Moreover, Fluids 1–3 are exemplary of lime and water-based drilling fluids, while Fluids 4 and 5 are exemplary of gel and water-based fluids.

Two oil-based drilling fluids ("Fluids 6–7 ") were prepared by combining the components as set forth in TABLE 1B below. The carrier fluid for Fluids 6 and 7 was diesel oil. As to the preparation of Fluids 6 and 7, lime was added to the carrier fluid in a Waring blender at 6000 rpm, and mixed for 1 minute. The EZMUL NT and the INVERMUL NT were added, and mixing was continued for an additional minute.

Water was then added in the indicated amount, and the rpm was increased to 12,000 rpm for 2 minutes to form an emulsion. The other components listed in Table 1B for Fluids 6 and 7, namely, the barite, lime, zeolite, GELTONE II, calcium chloride and Arquad T-50 were then added as indicated at 6,000 rpm over 1 minute intervals. When all the components had been added, the drilling fluid was mixed for about a minute at 6000 rpm.

Barite, lime, and calcium chloride as well as sources of same, are widely commercially available chemicals that are well known to those of ordinary skill in the art.

GELTONE II was the viscosifer used to contribute suspension properties to the fluids in which it was used (Fluid 6). The precise chemical description of GELTONE II is not known, however it is known to be a treated clay that functions as a viscosifier, and is commercially available from Baroid Drilling Fluids.

Arquad T-50™ is a trimethyltallow ammonium chloride (50% active) surfactant that is commercially available from Armak Industrial Chemicals Division.

The precise chemical description of EZMUL NT and the INVERMUL NT is not known, however the function of each is as an emulsifier, and each is commercially available from Baroid Drilling Fluids.

Chabazite, which is commercially available from C2C Zeolite Corporation of Calgary, Canada was the zeolite in Fluid 7, and was used in place of a conventional viscosifier, such as GELTONE II, to contribute suspension properties to the fluid. As noted above, the precise chemical composition of GELTONE II is not known, however it is known to be a treated clay. If the zeolite used in Fluid 7 had been treated in the same manner as GELTONE II, the amount of GELTONE II in Fluid 6 and zeolite in Fluid 7 would be more similar than the amounts indicated in Table 1B.

The components of Fluids 6 and 7 were added as described herein on the basis of percent by volume of the total drilling fluid composition. Fluid 6 is exemplary of

TABLE 1A

| | Water Based Drilling Fluids | | | | | |
|---|---|---|---|---|---|---|
| Component Function | Component Type (% by volume) | Fluid 1 | Fluid 2 | Fluid 3 | Fluid 4 | Fluid 5 |
| viscosifier | Bentonite | 1.96 | 0 | 0 | 0.98 | 0 |
| weighting agent | Barite | 7.17 | 2.52 | 4.6 | 8.16 | 2.52 |
| alkalinity source | Caustic soda | 0.13 | 0 | 0 | 0.01 | 0 |
| alkalinity source | Lime | 0.05 | 0.05 | 0.05 | 0 | 0 |
| dispersant | CFR-3 | 0 | 0 | 0 | 0 | 0.08 |
| filtrate control, with some viscosifying effects | Biozan | 0 | 0.20 | 0 | 0.22 | 0.20 |
| filtrate control | CARBONOX | 0.13 | 0 | 0 | 0 | 0 |
| filtrate control, with some viscosifying effects | FWCA | 0 | 0.18 | 0.18 | 0 | 0 |
| viscosifier | Zeolite (Chabazite) | 0 | 12.20 | 8.90 | 0 | 12.20 |
| | Water | 90.56 | 85.05 | 86.27 | 90.63 | 84.99 |
| Density (lb/gal) | | 10.55 | 10.24 | 10.47 | 10.68 | 10.23 | conventional oil-based drilling fluids, while Fluid 7 is exemplary of oil-based drilling fluids containing zeolite according to the present embodiments.

TABLE 1B

Oil Based Drilling Fluids

| Component Function | Component (% by volume) | Fluid 6 | Fluid 7 |
|---|---|---|---|
| weighting agent | Barite | 8.51 | 0.47 |
| alkalinity source | Lime | 0.26 | 0.25 |
| viscosifer | Zeolite (Chabazite) | 0 | 19.76 |
| emulsifier | INVERMUL NT | 1.64 | 1.58 |
| viscosifer | GELTONE II | 0.16 | 0 |
| salinity source | Calcium chloride | 0 | 0.15 |
| surfactant | Arquad T-50 | 0 | 0.10 |
| emulsifier | EZMUL NT | 0.21 | 0.20 |
| | Water | 21.57 | 20.7 |
| | Diesel | 67.66 | 56.8 |
| Density (lb/gal) | | 9.84 | 9.83 |

Fluids 2, 3, 5 and 7 indicated in Tables 1A and 1B are merely exemplary of the present embodiments. It is within the means of those of ordinary skill in the art to select different additives than those listed in Tables 1A and 1B, as well as different amounts than those listed in Tables 1A and 1B. Thus, one of ordinary skill in the art could, without unreasonable experimentation, formulate a drilling fluid comprising zeolite with any of a number of additives, such as weighting agents, viscosifiers, filtrate control agents, dispersants, emulsifiers, surfactants, foaming agents, de-air entraining agents, loss circulation material and lubricants, in order to achieve desired suspension properties for a given application.

EXAMPLE 2

Example 2 illustrates the use of zeolite as a suspending agent in drilling fluids according to the present embodiments.

Fluids 1–7 from Example 1 were tested to assess settling and to determine rheological data, from which yield point and plastic viscosity values could be calculated. The rheological data for Fluids 1–5 was determined according to Section 2 of API Specification RP 13B, $12^{th}$ Edition, 1988, of the American Petroleum Institute (the entire disclosure of which is hereby incorporated as if reproduced in its entirety). The Theological data for Fluids 6–7 was determined according to Section 2 of API Specification RP 13B-2, $2^{nd}$ Edition, 1991, of the American Petroleum Institute (the entire disclosure of which is hereby incorporated as if reproduced in its entirety).

When considering the suspension properties of a drilling fluid, rheological data is not conclusive. To more fully assess the suspension properties of a drilling fluid, the rheological data must be expressed in terms of plastic viscosity and yield point. Thus, the plastic viscosity and yield point of the water-based fluids (Fluids 1–5) were calculated from the determined Theological data according to calculations described in Section 2 of API Specification RP 13B, $12^{th}$ Edition, 1988, of the American Petroleum Institute. The plastic viscosity and yield point for the oil-based fluids (Fluids 6–7) were calculated from the determined rheological data according to calculations described in Section 2 of API Specification RP 13B-2, $2^{nd}$ Edition, 1991, of the American Petroleum Institute.

Settling was determined by visual observation, after allowing the fluids to stand for about an hour.

The results are reported in TABLE 2, where the "Z" following the fluid number indicates that the fluid comprises zeolite, and the "O" or "W" indicates whether the fluid is water-based or oil-based.

TABLE 2

| Fluid No. | Rheological Data (at Dial Readings) | | | | | | Plastic Viscosity (centipoise) | Yield Point (lb/100 ft$^2$) | Settling |
|---|---|---|---|---|---|---|---|---|---|
| | 600 rpm | 300 rpm | 200 rpm | 100 rpm | 6 rpm | 3 rpm | | | |
| 1 (W) | 24 | 18 | 15 | 12 | 11 | 10.5 | 6 | 12 | None |
| 2 (W) (Z) | 60 | 42 | 35 | 27 | 12 | 10 | 18 | 24 | None |
| 3 (W) (Z) | 47 | 34 | 29 | 22 | 9 | 8 | 13 | 21 | None |
| 4 (W) | 64 | 46 | 39 | 30 | 14 | 11 | 18 | 28 | None |
| 5 (W) (Z) | 58 | 40 | 32.5 | 24.5 | 10 | 8.5 | 18 | 22 | None |
| 6 (O) | 57 | 39 | 31 | 23 | 11 | 10 | 18 | 21 | None |
| 7 (O) (Z) | 114 | 61 | 43 | 23 | 1.5 | 1 | 53 | 8 | None |

Comparing the data for the lime and water-based fluids, (Fluids 1–3), Table 2 shows that lime and water-based fluids with zeolite (e.g., Fluids 2 and 3) attain favorable yield points as compared to lime and water-based fluids without zeolite (e.g, Fluid 1). In addition, the plastic viscosity values of Fluids 2 and 3 are within acceptable parameters for use as a drilling fluid.

Comparing the data for the gel and water-based fluids, (Fluids 4–5), Table 2 shows that gel and water-based fluids with zeolite (e.g., Fluid 5) attain yield points and plastic viscosities comparable to those of gel and water-based fluids without zeolite (e.g, Fluid 4), and which are within acceptable parameters for use as a drilling fluid.

Thus, when zeolite is substituted for a suspension agent, (such as the bentonite viscosifier in Fluids 1 and 4), in a water-based drilling fluid, the zeolite contributes acceptable suspension properties to the drilling fluid.

Comparing the data for the oil-based fluids, (Fluids 6–7), Table 2 shows that oil-based drilling fluids with zeolite (e.g., Fluid 7) attain yield points and plastic viscosities within acceptable parameters for use as a drilling fluid. Thus, when zeolite is substituted for a suspension agent, (such as the GELTONE II viscosifier in Fluid 6), in an oil-based drilling fluid, the zeolite contributes acceptable suspension properties to the drilling fluid.

As to whether water and oil based drilling fluids including zeolite had enough suspension properties to prevent settling, the testing involved allowing the fluids to stand for about an hour. After an hour, settling was not observed in any of Fluids 2, 3, 5 and 7, further indicating the ability of the zeolite to provide properties to the fluid sufficient to maintain a suspension.

Thus, Table 2 shows that zeolite is a suitable suspension agent, and can be used instead of, or in addition to, conventional suspension agents, such as viscosifiers.

EXAMPLE 3

Acceptable values of gel strength, gel plateau, filter cake thickness and filtrate loss are relevant in order to provide a drilling fluid with the properties required for use in drilling operations. The fluids from Example 1 were tested to determine gel strength, filter cake thickness and filtrate, in order to illustrate that drilling fluids comprising zeolite not only have acceptable suspension properties, but also attain acceptable values of gel strength, gel plateau, filter cake thickness and filtrate loss. The results are reported in TABLE 3, where the "Z" following the fluid number indicates that the fluid comprises zeolite, and the "O" or "W" indicates whether the fluid is water-based or oil-based.

The gel strength values for Fluids 1–5 were determined according to Section 2 of API Specification RP 13B, $12^{th}$ Edition, 1988, of the American Petroleum Institute (the entire disclosure of which is hereby incorporated as if reproduced in its entirety). The gel strength values for Fluids 6–7 were determined according to Section 2 of API Specification RP 13B-2, $2^{nd}$ Edition, 1991, of the American Petroleum Institute (the entire disclosure of which is hereby incorporated as if reproduced in its entirety). The reported value for Gel Strength Plateau of each fluid is the difference between the gel strength at 10 seconds and the gel strength at 10 minutes. Generally, low plateau values (i.e., less difference between the gel strength at 10 seconds and the gel strength at 10 minutes) are desired.

The filter cake and filtrate loss values for Fluids 1–5 were determined according to Section 3 of API Specification RP 13B, $12^{th}$ Edition, 1988, of the American Petroleum Institute (the entire disclosure of which is hereby incorporated as if reproduced in its entirety). The filter cake and filtrate loss values for Fluids 6–7 were determined according to Section 3 of API Specification RP 13B-2, $2^{nd}$ Edition, 1991, of the American Petroleum Institute (the entire disclosure of which is hereby incorporated as if reproduced in its entirety). Generally, thinner filter cakes and lower filtrate loss values are preferred.

TABLE 3

| Fluid No. | Gel Strength at Time (lb/100 ft²) | | Gel Strength Plateau | Filter Cake Thickness (inches) | Filtrate Loss (cc/30 min) |
| --- | --- | --- | --- | --- | --- |
| | 10 sec | 10 min | | | |
| 1 (W) | 12 | 21 | 9 | 7/32" | 32 |
| 2 (W) (Z) | 14 | 21 | 7 | 4/32" | 36 |
| 3 (W) (Z) | 10 | 15 | 5 | 4/32" | 32 |
| 4 (W) | 15 | 22 | 7 | 1/32" | 8.5 |
| 5 (W) (Z) | 10 | 17 | 7 | 5/32" | 36 |
| 6 (O) | 10 | 11 | 1 | 2/32" | 3.5 |
| 7 (O) (Z) | 3 | 3 | 0 | 5/32" | 3 |

Comparing the data for the lime and water-based fluids, (Fluids 1–3), Table 3 shows that lime and water-based fluids with zeolite (e.g., Fluids 2 and 3) attain gel strengths and gel plateaus comparable to those of lime and water-based fluids without zeolite (e.g, Fluid 1). The filter cake thickness and filtrate loss data are also comparable for Fluids 1–3.

Comparing the data for the gel and water-based fluids, (Fluids 4–5), Table 3 shows that gel and water-based fluids with zeolite (e.g., Fluid 5) attain gel strengths and gel plateaus comparable to those of gel and water-based fluids without zeolite (e.g, Fluid 4). The filter cake thickness and filtrate loss values for Fluid 5 are within acceptable parameters for use as a drilling fluid.

Thus, when zeolite is substituted for a suspension agent, (such as the bentonite viscosifier in Fluids 1 and 4), in a water-based drilling fluid, additional properties of the drilling fluid are also acceptable, as illustrated by the data in Table 3.

Comparing the data for the oil-based fluids, (Fluids 6–7), Table 3 shows that oil-based drilling fluids with zeolite (e.g., Fluid 7) attain improved gel strengths and gel plateaus over those of oil-based drilling fluids without zeolite (e.g., Fluid 6). The filter cake thickness and filtrate loss data are comparable for Fluids 6 and 7.

Thus, when zeolite is substituted for a suspension agent, (such as the GELTONE II viscosifier in Fluid 6), in an oil-based drilling fluid, additional properties of the drilling fluid are also acceptable, as illustrated by the data in Table 3.

EXAMPLE 4

Example 4 illustrates that fluids comprising zeolite develop compressive strength in the presence of a compressive strength-developing amount of activator, such as lime (also referred to as calcium hydroxide).

Four mixes were prepared by combining the components as set forth in TABLE 4 below. Specifically, the zeolite and the lime were dry-mixed by hand in a glass jar. This dry mix was then added over a 15 second period to a carrier fluid (water, in this example) being maintained in a Waring blender at 4,000 RPM. The blender speed was then increased to 12,000 RPM and mixing was continued for 35 seconds. The amount of lime and water used to form each mix is reported in the table as a "% bwoZ", which indicates a weight percent based on the weight of the zeolite. Chabazite, which is commercially available from C2C Zeolite Corporation of Calgary, Canada, was used as the zeolite for each mix.

The compressive strength for each mix was determined by Non-Destructive Sonic Testing as set forth in API Specification 10B 22nd Edition, 1997, of the American Petroleum Institute, the entire disclosure of which is incorporated herein by reference as if reproduced in its entirety. The compressive strength was measured at 160° F. at the reported elapsed times, and is reported in pounds per square inch (psi).

Although the mixes of Example 4 include only zeolite, water, and lime, the mixes are indicative of the expected reaction when a drilling fluid that includes zeolite comes into contact with an activator, such as calcium hydroxide. Thus, portions of a drilling fluid comprising zeolite that remain in filter cake on a wall of a wellbore, or in permeable areas in the wellbore, can be caused to set by circulation of a subsequent fluid containing an activator, which comes into contact with the zeolite.

TABLE 4

| Mix No. | Components | | | Compressive strength (psi) at 160° F. | | | |
|---|---|---|---|---|---|---|---|
| | Zeolite (wt %) | Lime (% bwoz) | Water (% bwoz) | 4 Hr | 8 Hr | 12 Hr | 24 Hr |
| 1 | 100 | 7 | 106 | 0 | 0 | 0 | 0 |
| 2 | 100 | 10 | 109 | 280 | 290 | 290 | 290 |
| 3 | 100 | 15 | 114 | 500 | 540 | 568 | 568 |
| 4 | 100 | 35 | 136 | 500 | 700 | 730 | 750 |

The compressive strength data for the mixes in Table 4 indicates that a drilling fluid comprising zeolite would develop compressive strength when the amount of an activator, such as lime, is present in an amount greater than about 7% based on the weight of the zeolite. Thus, portions of a drilling fluid comprising zeolite that remain in filter cake on a wall of a wellbore, or in permeable areas in the wellbore, can be caused to set by circulation of a subsequent fluid containing an activator in a compressive strength-developing amount.

In designing a drilling fluid that includes zeolite, the identity of the zeolite and the carrier fluid may influence the amount of activator necessary for the development of compressive strength. In addition, the identity of the activator may influence the amount of activator necessary for the development of compressive strength. Thus, in some embodiments, a compressive strength-developing amount of activator is less than the 7% illustrated by Example 4. Accordingly, the amount of activator used in practicing the present embodiments need only be at least a compressive strength-developing amount. Those of ordinary skill in the art can determine through the exercise of routine experimentation the amount of an activator sufficient for the development of compressive strength.

The development of compressive strength in the mixes of Example 4 was caused by the lime, also known as calcium hydroxide, which is a known activator for converting settable material in conventional settable spotting fluids. Thus, Example 4 illustrates that when an activator, such as lime, is brought into contact with a drilling fluid comprising zeolite the activator will cause the zeolite to set.

Contact between an activator and zeolite-containing drilling fluid remaining in a wellbore can be accomplished by various methods. The addition of the lime and zeolite together in the mixes as described in Example 4 simulates two of the various methods suitable for bringing an activator into contact with the zeolite. According to the first method simulated by this example, zeolite from a drilling fluid remains on the walls of the wellbore as part of the filter cake, and/or in permeable areas affecting the wellbore, such as fissures, fractures, caverns, vugs, thief zones, low pressure subterranean zones or high pressure subterranean zones. An activator is brought into contact with the zeolite remaining in the wellbore by circulation of a subsequent composition, such as a pill, spotting fluid or other mud, which contains the activator. According to the second method simulated by this example, an activator is brought into contact with the zeolite remaining in the wellbore by diffusion of an activator contained in a cement slurry that is subsequently pumped into the wellbore during primary cementing operations.

The two methods simulated by Example 4 are exemplary only, as a variety of methods for bringing a settable material into contact with an activator are suitable for use with the present embodiments.

While the preferred embodiments described herein relate to drilling fluids, it is understood that any wellbore treating fluids such as drilling, completion and stimulation fluids including, but not limited to, drilling muds, cement compositions well cleanup fluids, workover fluids, spacer fluids, gravel pack fluids, acidizing fluids, fracturing fluids and the like can be prepared using zeolite and a carrier fluid.

Preferred methods of performing drilling operations comprise circulating a drilling fluid comprising a carrier fluid and zeolite in a wellbore in a subterranean formation. Additional steps can include completing and/or stimulating a subterranean formation using the drilling fluid and producing a fluid, e.g., a hydrocarbon fluid such as oil or gas, from the subterranean formation.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

The invention claimed is:

1. A method of performing drilling operations comprising:
circulating a drilling fluid comprising zeolite and a carrier fluid in a wellbore penetrating a subterranean zone, wherein the zeolite is present in the drilling fluid in an amount of from about 1% to about 50% by volume, and comprises chabazite.

2. The method of claim 1 wherein the drilling fluid comprises zeolite in an amount from about 5% to about 20% by volume.

3. The method of claim 1 wherein the drilling fluid comprises zeolite in an amount from about 8% to about 15% by volume.

4. The method of claim 1 wherein the drilling fluid further comprises at least one weighting agent.

5. The method of claim 4 wherein the weighting agent is selected from barite, hematite, manganese tetraoxide, ilmenite, calcium carbonate and galena.

6. The method of claim 4 wherein the weighting agent is present in an amount of up to about 97% by volume of the drilling fluid.

7. The method of claim 4 wherein the weighting agent is present in an amount of from about 2% to about 57% by volume of the drilling fluid.

8. The method of claim 1 wherein the drilling fluid further comprises a viscosifier.

9. The method of claim 8 wherein the viscosifier is selected from clays, polymeric additives, modified cellulose and derivatives thereof, guar gum, emulsion forming agents, diatomaceous earth and starches.

10. The method of claim 9 wherein the viscosifier comprises a clay selected from kaolinite, montmorillonite, bentonite, hydrous micas, attapulgite, sepiolite, and laponite.

11. The method of claim 9 wherein the viscosifier comprises a polymeric additive that contains one or more hydroxyl, cis-hydroxyl, carboxyl, sulfate, sulfonate, amino or amide functional groups.

12. The method of claim 9 wherein the viscosifier comprises a polymeric additive comprising polysaccharide and derivatives thereof which contain one or more of the following monosaccharide units: galactose, mannose, glucoside, glucose, xylose, arabinose, fructose, glucuronic acid or pyranosyl sulfate.

13. The method of claim 9 wherein the viscosifier comprises a polymeric additive selected from the group consisting of guar gum and derivatives thereof, locust bean gum, tara, konjak, starch, cellulose, karaya gum, xanthan gum, tragacanth gum, arabic gum, ghatti gum, tamarind gum, carrageenan and derivatives thereof, carboxymethyl guar, hydroxypropyl guar, carboxymethyihydroxypropyl guar, polyacrylate, polymethacrylate, polyacrylamide, maleic anhydride, methylvinyl ether copolymers, polyvinyl alcohol and polyvinylpyrrolidone.

14. The method of claim 9 wherein the viscosifier comprises a modified cellulose selected from the group consisting of carboxyalkylcellulose ethers, mixed ethers, hydroxyalkylcelluloses, alkylhydroxyalkylcelluloses, alkylcelluloses, alkylcarboxyalkylcelluloses, alkylalkylcelluloses and hydroxyalkylalkylcelluloses.

15. The method of claim 14 wherein the viscosifier is selected from the group consisting of carboxyethylcellulose, carboxymethylcellulose, carboxymethylhydroxyethylcellulose; hydroxyethylcellulose, hydroxypropylcellulose, methylhydroxypropylcellulose, methylcellulose, ethylcellulose, propylcellulose, ethylcarboxymethylcellulose, methylethylcellulose, and hydroxypropylmethylcellulose.

16. The method of claim 8 wherein the viscosifier is selected from the group consisting of welan gum, xanthan gum, galactomannan gums, succinoglycan gums, scleroglucan gums, and cellulose and its derivatives.

17. The method of claim 1 wherein the drilling fluid further comprises a filtrate loss control agent comprising cellulose, and wherein the cellulose is present in an amount of from about 0.0 1% to about 2.5% by volume.

18. The method of claim 1 wherein the drilling fluid further comprises at least one dispersant.

19. The method of claim 18 wherein the drilling fluid further comprises at least one dispersant selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers.

20. The method of claim 18 wherein the drilling fluid comprises from about 0.2% to about 6% by volume of dispersant.

21. The method of claim 1 wherein the carrier fluid is selected from aqueous fluids, water, water-based gels, oil-based fluids, synthetic-based fluids, emulsions, acids, or mixtures thereof.

22. The method of claim 21 wherein the carrier fluid comprises water selected from fresh water, unsaturated salt solution, brine, seawater, and saturated salt solution.

23. The method of claim 21 wherein the carrier fluid comprises an oil-based fluid selected from canola oil, kerosene, diesel oil, fish oil, mineral oil, sunflower oil, corn oil, soy oil, olive oil, cottonseed oil, peanut oil and paraffin oil.

24. The method of claim 1 wherein the carrier fluid is present in the drilling fluid in an amount of from about 3% to about 98% by volume of the drilling fluid.

25. The method of claim 1 wherein the carrier fluid is present in the drilling fluid in an amount of from about 50% to about 92% by volume of the drilling fluid.

26. The method of claim 1 wherein the carrier fluid is present in the drilling fluid in an amount of from about 80% to about 90% by volume of the drilling fluid.

27. The method of claim 1 wherein the drilling fluid further comprises at least one of a surfactant, an emulsifier, a foaming agent, a de-air entraining agent, loss circulation material, and a lubricant.

28. A method of performing drilling operations comprising:
circulating a drilling fluid comprising zeolite and a carrier fluid in a wellbore penetrating a subterranean zone wherein the zeolite comprises chabazite; and
suspending, in the drilling fluid, one or more of cuttings, a weighting agent, and loss circulation material.

29. The method of claim 28 wherein the zeohte acts as a suspending agent for one or more of one or more of cuttings, a weighting agent, and loss circulation material.

30. The method of claim 28 wherein the drilling fluid comprises zeolite in an amount from about 1% to about 50% by volume.

31. The method of claim 28 wherein the drilling fluid comprises zeolite in an amount from about 5% to about 20% by volume.

32. The method of claim 28 wherein the drilling fluid comprises zeolite in an amount from about 8% to about 15% by volume.

33. The method of claim 28 wherein the weighting agent is selected from barite, hematite, manganese tetraoxide, ilmenite, calcium carbonate and galena.

34. The method of claim 28 wherein the carrier fluid is selected from aqueous fluids, water, water-based gels, oil-based fluids, synthetic-based fluids, emulsions, acids, or mixtures thereof.

35. The method of claim 28 wherein the carrier fluid comprises water selected from fresh water, unsaturated salt solution, brine, seawater, and saturated salt solution.

36. The method of claim 28 wherein the carrier fluid comprises an oil-based fluid selected from canola oil, kerosene, diesel oil, fish oil, mineral oil, sunflower oil, corn oil, soy oil, olive oil, cottonseed oil, peanut oil and paraffin oil.

37. A method of performing drilling operations comprising:
drilling a wellbore penetrating a subterranean zone with drilling fluid comprising zeolite and a carrier fluid, wherein the zeolite is present in the drilling fluid in an amount of from about 1% to about 50% by volume, and comprises chabazite;
leaving a portion of the drilling fluid in one or more of a filter cake, a fissure, a fracture, a cavern, a vug, a thief zone, a low pressure subterranean zone and a high pressure subterranean zone; and
causing the zeolite in the left portion of the drilling fluid to set.

38. The method of claim 37 wherein causing the zeolite to set further comprises:
placing a subsequent composition comprising a compressive strength-developing amount of an activator in the wellbore; and
contacting the zeolite in the left portion of the drilling fluid with the activator.

39. The method of claim claim 38 further comprising placing a cement slurry in the wellbore after the placing of the subsequent composition.

40. The method of claim 38 wherein the subsequent composition is a cement slurry comprising a compressive strength-developing amount of an activator, and diffusion of the activator from the cement slurry into the left portion of the drilling fluid causes the zeolite to set.

41. The method of claim 38 wherein the subsequent composition is one of a mud, a spotting fluid, and a pill comprising a compressive-strength developing amount of an activator.

42. The method of claim 38 wherein the activator is selected from calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

43. The method of claim 38 wherein the activator is present in a weight percent greater than about 7 percent of the weight of the zeolite.

* * * * *